US006440922B1

(12) United States Patent
Garnett et al.

(10) Patent No.: US 6,440,922 B1
(45) Date of Patent: *Aug. 27, 2002

(54) DETERGENT COMPOSITION COMPRISING ZEOLITE AND AMYLASE ENZYME

(75) Inventors: Carolyn Jayne Garnett, Brussels (BE); Jonathan Richard Clare, Newcastle upon Tyne (GB); Johan Juliaan Serafin Wauben, Lint (BE)

(73) Assignee: The Procter & Gamble Company, Cincinnati, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/860,941

(22) PCT Filed: Jan. 5, 1996

(86) PCT No.: PCT/US96/00281

§ 371 (c)(1), (2), (4) Date: Jul. 14, 1997

(87) PCT Pub. No.: WO96/21717

PCT Pub. Date: Jul. 18, 1996

(30) Foreign Application Priority Data

Jan. 14, 1995 (GB) ............................................ 9500738

(51) Int. Cl.[7] ............................ C11D 3/00; C11D 7/42; C12S 9/00

(52) U.S. Cl. ....................... 510/392; 510/392; 510/321; 510/309; 510/312; 510/313; 510/334; 510/320; 510/530; 510/532; 510/507

(58) Field of Search ................................ 510/320, 321, 510/392, 530, 532, 507, 334, 309, 312, 313

(56) References Cited

U.S. PATENT DOCUMENTS

| | | | | | |
|---|---|---|---|---|---|
| 4,900,475 | A | | 2/1990 | Ramachandran et al. | 252/532 |
| 5,030,377 | A | | 7/1991 | Sone et al. | 252/124.12 |
| H1513 | H | * | 1/1996 | Murch et al. | 252/546 |
| 5,500,153 | A | * | 3/1996 | Figueroa et al. | 252/548 |
| 5,557,560 | A | * | 9/1996 | Miracle et al. | 548/334.1 |
| 5,565,145 | A | * | 10/1996 | Watson | 510/350 |
| 5,567,235 | A | * | 10/1996 | Gosselink et al. | 546/210 |
| 5,707,950 | A | * | 1/1998 | Kasturi et al. | 510/320 |

FOREIGN PATENT DOCUMENTS

| | | | |
|---|---|---|---|
| DE | 2656009 | | 6/1977 |
| DE | 4034131 | | 4/1992 |
| EP | 0384070 | * | 8/1990 |
| EP | 0544492 | | 6/1993 |
| EP | 0552053 | | 7/1993 |
| EP | 0552 053 | * | 7/1993 |
| EP | 0580245 | | 1/1994 |
| WO | WO 9400545 | | 1/1994 |
| WO | 94/02597 | * | 2/1994 |

* cited by examiner

*Primary Examiner*—Yogendra N. Gupta
*Assistant Examiner*—Eisa Elhilo
(74) *Attorney, Agent, or Firm*—Frank Taffy; C. Brant Cook; Kim W. Zerby

(57) ABSTRACT

A detergent composition comprises a zeolite builder having a particle size, expressed as a $d_{50}$ value, of less than 1.0 micrometers, an amylase enzyme, and an alkoxylated nonionic surfactant having a hydrophilic lipophilic balance value of less than 9.5 selected from the group consisting of alkoxylated adducts of fatty alcohols containing an average of less than 5 alkylene oxide groups per molecule. The detergent composition has been found to reduce white residue formation on fabrics washed with detergent containing small particle size zeolite.

16 Claims, No Drawings

DETERGENT COMPOSITION COMPRISING ZEOLITE AND AMYLASE ENZYME

The present invention relates to a detergent composition comprising an amylase enzyme and a small particle size zeolite component as a sequestering agent for water hardness.

Conventionally, water soluble inorganic phosphates, such as sodium tripolyphosphate, have been used as builders for laundry detergents.

More recently, alkali metal aluminosilicate ion-exchangers, particularly crystalline water insoluble sodium aluminosilicate zeolites, have been proposed as replacements for the inorganic phosphates.

For example, EP 21 491A (Procter & Gamble) discloses detergent compositions containing a builder system which includes zeolite A, X or P (B) or a mixture thereof. EP 384070A (Unilever) discloses specific zeolite P materials having. an especially low silicon to aluminium ratio not greater than 1.33 (hereinafter referred to as zeolite MAP) and describes their use as detergency builders.

The Applicants have now surprisingly found that a problem may occur when a water insoluble zeolite having a small particle size, is used as a detergency builder in a composition formulated for use in the laundering of fabrics. The problem has been found to be particularly pronounced when the zeolite is zeolite MAP.

The choice of a small particle size for a zeolite MAP component, that is to say particles having a particle size, measured as a $d_{50}$ value, of up to 1.0 micrometres has previously been taught to be preferred in the art, as represented, for example, by EP 384070 A.

The problem relates to the formation of white residues, which adhere to the fabrics and remain thereon at the end of a laundry washing process. The degree of residue formation may vary. On coloured fabrics the appearance of the white residues tends to be visually more apparent than on white fabrics. White residues frequently form on areas of fabric where there is a stain present, interfering with and preventing the complete removal of the stain. As a result of the visible contrast between the white residues and the coloured fabric, the stained area on which white deposits have formed may be more noticeable that the original stain.

It has been established that when an amylase enzyme is employed in compostions containing zeolite in small particle size form that the problem of the white residue formation on the fabrics is reduced.

Whilst the prior art, as represented for example by European Patent Aplications, EP 384070 A, EP 448297 A, EP 522726 A, EP 533392 A, EP 544492 A, EP 552053 A, and EP 552054 A has envisaged the use of enzymes in combination with small particle size zeolite MAP in laundry detergent compositions, none of these prior art documents specifically disclose the use of amylase enzyme with a small particle size zeolite MAP component. Furthermore, none of these prior art documents provides any teaching relating to the white residue deposit problem addressed by the current invention, nor of any solution thereto involving the selection of a particular enzyme.

According to the present invention there is provided a detergent composition containing (a) a zeolite builder having a particle size, expressed as a $d_{50}$ value, of less than 1.0 micrometres;

(b) an amylase enzyme;

In a preferred aspect the zeolite builder comprises zeolite P having a silicon to aluminium ratio of not greater than 1.33 (zeolite MAP)

DETAILED DESCRIPTION OF THE INVENTION

Zeolite Builder

The first essential component of the present invention is an aluminosilicate zeolite builder, optionally in conjunction with one or more supplementary builders.

The zeolite builder is typically present at a level of from 1% to 80%, more preferably from 15% to 40% by weight of the compositions.

In an essential aspect the zeolite detergent builder has a particle size, expressed as a $d_{50}$ value of less than 1.0 micrometres, more preferably from 0.05 to 0.9 micrometres, most preferably from 0.2 to 0.7 micrometres.

The $d_{50}$ value indicates that 50% by weight of the particles have a diameter smaller than that figure. The particle size may, in particular be determined by conventional analytical techniques such as microscopic determination using a scanning electron microscope or by means of a laser granulometer.

Suitable aluminosilicate zeolites have the unit cell formula $Na_z[(AlO_2)_z(SiO_2)_y]$. $XH_2O$ wherein z and y are at least 6; the molar ratio of z to y is from 1.0 to 0.5 and x is at least 5, preferably from 7.5 to 276, more preferably from 10 to 264. The aluminosilicate material are in hydrated form and are preferably crystalline, containing from 10% to 28%, more preferably from 18% to 22% water in bound form.

The aluminosilicate zeolites can be naturally occurring materials, but are preferably synthetically derived. Synthetic crystalline aluminosilicate ion exchange materials are available under the designations Zeolite A, Zeolite B, Zeolite P, Zeolite X, Zeolite MAP, Zeolite HS and mixtures thereof.

Zeolite A has the formula $$Na_{12}[AlO_2)_{12}(SiO_2)_{12}].xH_2O$$

wherein x is from 20 to 30, especially 27. Zeolite X has the formula $Na_{86}[(AlO_2)_{86}(SiO_2)_{106}].276\ H_2O$.

Zeolite MAP is described in EP 384070A (Unilever). It is defined as an alkali metal alumino-silicate of the zeolite P type having a silicon to aluminium ratio not greater than 1.33, preferably within the range from 0.9 to 1.33 and more preferably within the range of from 0.9 to 1.2.

Of particular interest is zeolite MAP having a silicon to aluminium ratio not greater than 1.15 and, more particularly, not greater than 1.07.

Zeolite P having a Si:Al ratio of 1.33 or less may be prepared by the following steps:

(i) mixing together a sodium aluminate having a mole ratio $Na_2O:Al_2O_3$ within the range of from 1.4 to 2.0 and a sodium silicate having a mole ratio $SiO_2:Na_2O$ within the range of from 0.8 to 3.4 with vigorous stirring at a temperature within the range of from 25° C. to boiling point usually 95° C., to give a gel having the following composition; $Al_2O_3:(1.75–3.5)SiO_2:(2.3–7.5)Na_2O:P(80–450)H_2O$;

(ii) ageing the gel composition for 0.5 to 10 hours, preferably 2 to 5 hours, at a temperature within the range of from 70° C. to boiling point, usually to 95° C., with sufficient stirring to maintain any solids present in suspension;

(iii) separating the crystalline sodium aluminosilicate thus formed, washing to a pH within the range of from 10 to 12.5, and drying, preferably at a temperature not exceeding 150° C., to a moisture content of not less than 5 Wt. %.

Preferred drying methods are spray-drying and flash drying. It appears that oven drying at too high a temperature may adversely affect the calcium binding capacity of the product under certain circumstances.

Commercial sodium metasilicate pentahydrate dissolved in water and commercial sodium silicate solution (waterglass) are both suitable silica sources for the production of zeolite P in accordance with the invention. The reactants may be added together in any order either rapidly or slowly. Rapid addition at ambient temperature, and slow addition at elevated temperature (90–95° C.) both give the desired product.

Vigorous stirring of the gel during the addition of the reactants, and at least moderate stirring during the subsequent ageing step, however, appear to be essential for the formation of pure zeolite P. In the absence of stirring, various mixtures of crystalline and amorphous materials may be obtained.

Zeolite MAP generally has a calcium binding capacity of at least 150 mg CaO per g of anhydrous aluminosilcate, as measured by the standard method described in GB 1473201 (Henkel). The calcium binding capacity is normally 160 mg CaO/g and may be as high 170 mg CaO/g.

Although zeolite MAP like other zeolites contains water of hydration, for the purposes of the present invention amounts and percentages of zeolite are expressed in terms of the notional anhydrous material.

The amount of water present in hydrated zeolite MAP at ambient temperature and humidity is generally about 20 wt. %.

Amylase

The second essential component of the compositions is an amylase enzyme, that is to say an enzyme having amylolytic activity.

The amylase enzyme is typically incorporated into the compositions in accordance with the invention at a level of from 0.01% to 5%, preferably from 0.1% to 3%, more preferably from 0.2% to 2%, most preferably from 0.3% to 1.5% active enzyme by weight of the composition, on a 60 KNU/g (Kilo Novo Units/gram) activity basis.

The units of 'Kilo Novo Units/gram (KNU/g)' are a well known means of defining amylolytic enzyme activity and are described in GB-1,269,839 A (Novo). In more detail, 1 KNU is the amount of enzyme which breaks down 5.25 grams of starch (Merck, Amylum Solubile Erg. B.6, Batch 9947275) per hour in the method described in GB-1,269,839 A, which has the following standard conditions:

| | |
|---|---|
| Substrate | Soluble starch |
| Calcium content in solvent | 0.0043 M |
| Reaction time | 7–20 minutes |
| Temperature | 37° C. |
| pH | 5.6 |

The amylase enzyme may be fungal or bacterial in origin. Amylases obtained by chemical or genetic manipulation of fungal or bacterial derived strains are also useful herein. The amylase enzyme is preferably an α-amylase.

Preferred amylases include, for example, α-amylases obtained from a special strain of B. licheniformis, described in more detail in GB-1,269,839 A. Reported deposit numbers for B. licheniformis stains capable of producing α-amylases include NCIB 8061, NCIB 8059, ATCC 6634, ATCC 6598, ATCC 11945, ATCC 8480 and ATCC 9945a.

Preferred commercially available α-amylases include for example, those sold under the tradename Rapidase and Maxamyl by Gist-Brocades; those sold under the tradename Taka-Therm L-340 by Miles Laboratories, Elkhart, Indiana; those sold under the tradename Rohalase AT by Rohm and Haas, West Philadelphia, Pa.; and those sold under the tradenames Termamyl 60T and 120T, Fungamyl and BAN by Novo Industries A/S.

In a preferred aspect, the amylases have been designed to have improved stability, particularly having improved stability to oxidation, for example in a bleaching environment, and improved thermal stability. Stability can be measured using any of the technical tests known in the art including those referred to in WO 94/02597 A. Stability-enhanced amylases are commercially available from Novo Industries A/S or from Genencor International.

Highly preferred amylases with enhanced oxidative stability are derived using site-directed mutagenesis from one or more of the Baccillus amylases, especialy the Bacillus α-amylases, regardless of whether one, two or multiple amylase strains are the immediate precursors. Preferred amylases of this type are described in WO 94/02597 A, and comprise a mutant in which substitution is made, using alanine or threonine, preferably threonine, of the methionine residue located in position 197 of the B. licheniformis α-amylase, sold under the tradename Termamyl, or the homologous position variation of a similar parent amylase, such as B. amyloliquefaciens, B.subtilis, or B.stearothermophilus.

Other preferred amylases having enhanced oxidative stability, derived from B.licheniformis NCIB806, are described by Genencor International in a paper entitled "Oxidatively Resistant α-Amylases" which was presented at the 207th American Chemical Society National Meeting, Mar. 13–17, 1994, by C. Mitchinson. Methionine (Met) was identified as the most likely residue to be modified. Met was substituted, one at a time, in positions 8, 15, 197, 256, 304, 366 and 438 leading to specific mutants, particularly important being M197L and M197T with the M197T variant being the most stable expressed variant.

Other preferred amylases having enhanced oxidative stability include those described in WO 94/18314 A (Genencor International) and WO 94/02597 A (Novo). Any other oxidative stability-enhanced amylase can be used, for example as derived by site-directed mutagenesis from known chimeric, hybrid or simple mutant parent forms of available amylases. Other enzyme modifications are acceptable including those described in WO 95/09909 A (Novo).

It will be appreciated that enzymes for incorporation into solid detergent compositions are generally sold commercially as enzyme prills containing active enzyme supported on a variety of inert host materials, which for example, can include alkali metal sulfates, carbonates and silicates. Optionally, organic binder materials are also incorporated. In a preferred aspect, the calcium content of these enzyme prills is minimzed to ensure good in-product storage stability of the enzyme.

Additional Detergent Components

The detergent composition according to the invention may contain other detergent components such as surfactants, cobuilders, bleaches, fluorescers, antiredeposition agents, inorganic salts such as sodium sulphate, other enzymes, lather control agents, fabric softening agents, pigments, coloured speckles and perfumes.

Surfactant

The detergent composition according to the invention preferably includes a surfactant selected from anionics, nonionics, zwitterionics, ampholytics and cationics.

The surfactant is preferably present in the detergent compositions at a level of from 1% to 50%, preferably from 3% to 30%, most preferably from 5% to 20% by weight of the compositions.

Many suitable detergent-active compounds are available and fully described in the literature (for example "Surface Active Agents and Detergents" Volumes I and II by Schwartz, Perry and Berch).

Examples of suitable additional anionic surfactants include anionic sulfates, olefin sulphonates, alkyl xylene sulphonates, dialkylsulphosuccinates, and fatty acid ester sulphonates. Sodium salts are generally preferred.

Anionic Sulfate Surfactant

Anionic sulfate surfactants suitable for use herein include the linear and branched primary alkyl sulfates, alkyl ethoxysulfates, fatty oleoyl glycerol sulfates, alkyl phenol ethylene oxide ether sulfates, the $C_5$–$C_{17}$ acyl-N—($C_1$–$C_4$ alkyl) and —N—($C_1$–$C_2$ hydroxyalkyl) glucamine sulfates, and sulfates of alkylpolysaccharides such as the sulfates of alkylpolyglucoside (the nonionic nonsulfated compounds being described herein).

Alkyl ethoxysulfate surfactants are preferably selected from the group consisting of the $C_6$–$C_{18}$ alkyl sulfates which have been ethoxylated with from 0.5 to 20 moles of ethylene oxide per molecule. More preferably, the alkyl ethoxysulfate surfactant is a $C_6$–$C_{18}$ alkyl sulfate which has been ethoxylated with from 0.5 to 20, preferably from 0.5 to 5, moles of ethylene oxide per molecule.

Anionic Sulfonate Surfactant

Anionic sulfonate surfactants suitable for use herein include the salts of $C_{5-C20}$ linear alkylbenzene sulfonates, alkyl ester sulfonates, $C_6$–$C_{22}$ primary or secondary alkane sulfonates, $C_6$–$C_{24}$ olefin sulfonates, sulfonated polycarboxylic acids, alkyl glycerol sulfonates, fatty acyl glycerol sulfonates, fatty oleyl glycerol sulfonates, and any mixtures thereof.

Nonionic Surfactant

The nonionic surfactant is preferably a hydrophobic nonionic surfactant, particularly an alkoxylated nonionic surfactant, having a hydrophilic lipophilic balance (hlb) value of <9.5, more preferably <10.5.

Examples of suitable hydrophobic alkoxylated nonionic surfactants include alkoxylated adducts of fatty alcohols containing an average of less than 5 alkylene oxide groups per molecule.

The alkylene oxide residues may, for example, be ethylene oxide residues or mixtures thereof with propylene oxide residues.

Preferred alkylene oxide adducts of fatty alcohols useful in the present invention can suitably be chosen from those of the general formula:

$$R—O—(C_nH_{2n}O)_yH$$

wherein R is an alkyl or alkenyl group having at least 10 carbon atoms, most preferably from 10 to 22 carbon atoms, y is from 0.5 to 3.5 and n is 2 or 3.

Preferred nonionic surfactants include primary $C_{11}$–$C_{15}$ aliphatic alcohols condensed with an average of no more than five ethylene oxide groups per molecule of alcohol, having an ethylene oxide content of less than 50% by weight, preferably from 25% to less than 50% by weight.

A particularly preferred aliphatic alcohol ethoxylated is a primary alcohol having an average of 12 to 15 carbon atoms in the chain condensed with an average of three ethoxy groups per molecule of alcohol.

Specific examples of suitable alkoxylated adducts of fatty alcohols are Synperonic A3 (ex ICI), which is a $C_{13}$–$C_{15}$ alcohol with about three ethylene oxide groups per molecule and Empilan KB3 (ex Marchon), which is lauric alcohol 3EO.

Another class of nonionic sufactants comprises alkyl polyglucoside compounds of general formula $$RO(C_nH_{2n}O)_tZ_x$$

wherein Z is a moiety derived from glucose; R is a saturated hydrophobic alkyl group that contains from 12 to 18 carbon atoms; t is from 0 to 10 and n is 2 or 3; x is from 1.1 to 4, the compounds including less than 10% unreacted fatty alcohol and less than 50% short chain alkyl polyglucosides. Compounds of this type and their use in detergent compositions are disclosed in EP-B 0070074, 0070077, 0075996 and 0094118.

Cobuilders

In addition to zeolite MAP, the builder system may contain an organic or inorganic cobuilder.

Suitable organic cobuilders can be monomeric or polymeric carboxylates such as citrates or polymers of acrylic, methacrylic and/or maleic acids in neutralised form. Suitable inorganic cobuilders include carbonates and amorphous and crystalline layered silicates.

Suitable crystalline layered silicates have the composition:

$$NaMSi_xO_{2x}+1._yH_2O$$

where M is sodium or hydrogen, preferably sodium; x is a number from 1.9 to 4; and y is a number from 0 to 20. Such materials are described in U.S. Pat. No. 4,664,839; U.S. Pat. No. 4,728,443 and U.S. Pat. No. 4,820,439 (Hoechst AG). Especially preferred are compounds in which x=2 and y=O. The synthetic material is commercially available from Hoechst AG as δ —$Na_2Si_2O_5$ (SKS6) and is described in U.S. Pat. No. 4,664,830.

The total amount of detergency builder in the granular composition typically ranges from 10 to 80 wt. %, more preferably from 15 to 60 wt % and most preferably from 10 to 45 wt. %.

Bleach

Detergent compositions according to the invention may also suitably contain a bleach system. This preferably comprises one or more peroxy bleach compounds, for example, inorganic persalts or organic peroxyacids, which may be employed in conjunction with bleach precursors to improve bleaching action at low temperatures.

The bleach system preferably comprises a peroxy bleach compound, preferably an inorganic persalt, optionally in conjunction with a peroxyacid bleach precursor. Suitable persalts include sodium perborate monohydrate and tetrahydrate and sodium percarbonate, with sodium percarbonate being most preferred.

Preferred bleach precursors are peracetic acid precursors, such as tetraacetylethylene diamine (TAED); peroxybenzoic acid precursors.

Physical Form

The detergent composition according to the invention may be of any physical type, for example powders, liquids and gels. However, granular and liquid compositions are preferred.

Making Process

The detergent compositions of the invention may be prepared by any suitable method. The particulate detergent compositions are suitably prepared by any tower (spray-drying) or non-tower process.

In processes based around a spray-drying tower, a base powder is first prepared by spray-drying a slurry and then other components unsuitable for processing via the slurry can be sprayed on or admixed (postdosed).

The zeolite builder is suitable for inclusion in the slurry, although it may be advantageous for processing reasons for part of the zeolite builder to be incorporated post-tower. The crystalline layered silicate, where this is employed, is also incorporated via a non-tower process and is preferably postdosed.

Alternatively, particulate detergent compositions in accordance with the invention may be prepared by wholly non-tower processes such as granulation.

The granular detergent compositions of the invention may be prepared to any suitable bulk density. The compositions preferably have a bulk density of at least 400 g/l preferably at least 550 g/l, most preferably at least 700 g/l and, with particular preference at least 800 g/l.

The benefits of the present invention are particularly evident in powders of high bulk density, for example, of 700 g/l or above. Such powders may be prepared either by post-tower densification of spray-dried powder, or by wholly non-tower methods such as dry mixing and granulation; in both cases a high-speed mixer/granulator may advantageously be used. Processes using high-speed mixer/granulators are disclosed, for example, in EP340 013A, EP 367 339A, EP 390 251A and EP 420 317A (Unilever).

The detergent composition of the invention may be formulated as a liquid detergent composition which may be aqueous or anhydrous. The term "liquid" used herein includes pasty viscous formulations such as gels. The liquid detergent composition generally has a pH of from 6.5 to 10.5.

The total amount of detergency builder in the liquid composition is preferably from 5 to 70% of the total liquid composition.

Illustrative compositions according to the present invention are presented in the following Examples.

In the detergent compositions, the abbreviated component identifications have the following meanings:

LAS: $C_{11}$–$C_{13}$ linear alkyl benzene sulfonate

45AS: Branched sodium alkyl sulfate surfactant containing $C_{14}$–$C_{15}$ alkyl chains 246AS: Sodium alkyl sulfate surfactant containing a alkyl chain length weight distribution of 15% $C_{12}$ alkyl chains, 45% $C_{14}$ alkyl chains, 35% $C_{16}$ alkyl chains, 5% $C_{18}$ alkyl chains TAS: Sodium alkyl sulfate surfactant containing predominantly $C_{16-C18}$ alkyl chains derived from tallow oil.

24AE3S: $C_{12}$–$C_{14}$ alkyl ethoxysulfate containing an average of three ethoxy groups per mole 35E3: A $C_{13-15}$ primary alcohol condensed with an average of 3 moles of ethylene oxide 25E3: A $C_{12}$–$C_{15}$ primary alcohol condensed with an average of 3 moles of ethylene oxide 24EY: A $C_{12-14}$ linear primary alcohol condensed with an average of Y moles of ethylene oxide Citrate: Sodium citrate Carbonate: Anhydrous sodium carbonate Perborate: Sodium perborate tetrahydrate Percarbonate: Sodium percarbonate TAED: Tetra acetyl ethylene diamine Silicate: Amorphous Sodium Silicate ($SiO_2$:$Na_2O$ ratio normally follows)

CMC: Carboxymethylcellulose

Suds: 25% paraffin wax Mpt 50° C., 17% Suppressor hydrophobic silica, 58% paraffin oil Zeolite MAP: Hydrated sodium aluminosilicate zeolite MAP having a silicon to aluminium ratio of 1.07 having a particle size, expressed as a $d_{50}$ value, of 0.5 micrometres Zeolite A: Hydrated sodium aluminosilicate zeolite A having a particle size, expressed as a $d_{50}$ value, of 0.6 micrometres MA/AA: Copolymer of 1:4 maleic/acrylic acid, average molecular weight about 80,000.

Amylase: Amylolytic enzyme sold under the tradename Termamyl 60T by Novo Industries A/S (60 KNU/gram enzyme activity)

BSA: Amylolytic enzyme—M197T variant, having enhanced oxidative stability (60 KNU/gram enzyme activity)

Protease: Proteolytic enzyme sold by Novo Industries A/S under the tradename Savinase of activity 4.0 KNPU/gram.

Lipase: Lipolytic enzyme sold by Novo Industries A/S under the tradename lipolase of activity 100,000 LU/gram

EXAMPLE 1

The following granular laundry detergent compositions were prepared (parts by weight) in accordance with the invention. All amylase enzyme levels relate to levels of active enzyme, expressed on a 60 KNU/g activity basis.

| | A | B | C | D | E |
|---|---|---|---|---|---|
| 246AS | 7.6 | 6.5 | 4.8 | 6.8 | — |
| TAS | — | — | — | — | 8.6 |
| 24AE3S | 2.4 | — | 1.2 | 1.7 | — |
| 25E3 | 3.26 | — | — | — | 6.3 |
| 35E3 | — | 5.0 | 5.0 | 5.0 | — |
| Zeolite MAP | 20.0 | 25.0 | 20.0 | — | 16.0 |
| Zeolite A | — | — | — | 25.0 | 15.0 |
| Carbonate | 15.0 | 15.0 | 20.0 | 10.0 | 12.0 |
| MA/AA | 4.25 | 4.25 | 4.25 | 4.25 | 2.0 |
| Perborate | — | 16.0 | — | 16.0 | 20.0 |
| Percarbonate | 20.0 | — | 20.0 | — | — |
| TAED | 5.0 | 5.0 | 5.0 | 5.0 | 6.7 |
| Amylase | 0.2 | 0.5 | — | 0.2 | 0.1 |
| BSA | — | — | 0.1 | — | — |
| Protease | 0.04 | 0.08 | — | 0.05 | 0.05 |
| Silicate(2.0 ratio) | 4.0 | — | — | 4.0 | 3.0 |

Water and miscellaneous (Including suds suppressor, sodium sulphate, perfume) to balance

EXAMPLE 2

The following granular laundry detergent compositions of density 850 gram/litre are prepared (parts by weight) in accordance with the invention. All amylase levels relate to levels of active enzyme, expressed on a 60 KNU/g activity basis.

| | F | G | H | I | J |
|---|---|---|---|---|---|
| 45AS | 9.0 | 8.5 | 9.5 | 9.0 | 6.0 |
| LAS | — | — | — | — | 3.0 |
| 24E3 | 2.8 | 2.9 | 3.0 | 2.8 | 2.8 |
| 24E5 | 6.5 | 6.4 | 6.5 | 6.2 | 6.5 |
| Zeolite MAP | 32.0 | 35.0 | 25.0 | — | 16.0 |
| Zeolite A | — | — | — | 30.0 | 15.0 |
| Citrate | 3.3 | 3.0 | 3.5 | 3.5 | 3.0 |
| Carbonate | 9.0 | 9.0 | 9.0 | 10.0 | 12.0 |
| MA/AA | — | — | — | — | 2.0 |
| CMC | 0.8 | 0.5 | 0.8 | 1.0 | 0.8 |

-continued

| | F | G | H | I | J |
|---|---|---|---|---|---|
| Perborate | — | — | — | — | 16.0 |
| Percarbonate | 20.0 | 18.0 | 20.0 | 22.0 | — |
| TAED | 4.7 | 4.7 | 4.7 | 4.7 | 4.7 |
| Amylase | 0.1 | 0.3 | — | 0.5 | 0.2 |
| BSA | — | — | 0.4 | — | — |
| Protease | 2.4 | 2.0 | 1.5 | 2.0 | 1.0 |
| Lipase | 0.35 | 0.35 | 0.4 | 0.3 | 0.2 |
| Silicate(1.6 ratio) | 5.1 | 6.0 | 4.5 | 5.0 | 5.0 |

Water and miscellaneous (including suds suppressor, sodium sulphate, perfume) to balance

What is claimed is:

1. A detergent composition comprising:

(a) a zeolite builder having a particle size, expressed as a $d_{50}$ value, of less than 1.0 micrometers;

(b) an amylase enzyme; and (c) an alkoxylated nonionic surfactant having a hydrophilic lipophilic balance value of less than 9.5 selected from the group consisting of alkoxylated adducts of fatty alcohols containing an average of less than 5 alkylene oxide groups per molecule.

2. A detergent composition according to claim 1 wherein said zeolite builder has a particle size, expressed as a $d_{50}$ value of from 0.05 to 0.9 micrometers.

3. A detergent composition according to claim 1 wherein said zeolite builder comprise zeolite P having a silicon aluminium ratio of not greater than 1.33 (zeolite MAP).

4. A detergent composition according to claim 1 wherein said amylase enzyme is an α-amylase.

5. A detergent composition according to claim 1 wherein said amylase enzyme has been modified such as to enhance its oxidative stability.

6. A detergent composition according to claim 1 wherein said amylase enzyme is present at a level of from 0.01% to 5%, active enzyme by weight of the composition, on a 60 KNU/g activity basis.

7. A detergent composition according to claim 6 wherein said amylase enzyme is present at a level of from 0.2% to 2% active enzyme by weight of the composition on a 60 KNU/g activity basis.

8. A detergent composition according to claim 1 containing an organic or inorganic cobuilder.

9. A detergent composition according to claim 8 wherein said cobuilder is a crystalline layered silicate.

10. A detergent composition according to claim 1 containing a bleach system comprising a peroxy bleach compound and a peroxyacid bleach precursor.

11. A detergent composition according to claim 10 wherein said peroxy bleach compound is sodium percarbonate.

12. A detergent composition according to claim 1 wherein the composition is in the form of a granular composition having a bulk density of at least 800 g/l, and wherein the alkoxylated nonionic surfactant is selected from the group consisting of primary $C_{12-15}$ aliphatic alcohols condensed with an average of 3 ethylene oxide groups per molecule alcohol.

13. A detergent composition according to claim 1, wherein the composition is in the form of a liquid and has a pH of from 6.5 to 10.5.

14. A detergent composition comprising:

(a) 1% to 40%, by weight, zeolite MAP builder having a particle size, expressed as a $d_{50}$ value, of less than 1.0 micrometers;

(b) 0.1% to 3%, by weight, α-amylase;

(c) 3% to 30%, by weight, surfactant comprising an alkoxylated nonionic surfactant selected from the group consisting of primary $C_{12-15}$ aliphatic alcohols condensed with an average of 3 ethylene oxide groups per molecule alcohol;

(d) organic builder selected from the group consisting of monomeric carboxylates, polymeric carboxylates and mixtures thereof;

(e) inorganic persalt; and (f) peracetic acid precursor;

wherein the total amount of detergency builder is in the range of from 10% to 80%, by weight.

15. A detergent composition according to claim 14, further comprising an enzyme selected from the group consisting of proteases, lipases and mixtures thereof.

16. A detergent composition according to claim 15, further comprising an inorganic builder selected from the group consisting of carbonates, amorphous silicates, crystalline layered silicates and mixtures thereof.

* * * * *